(12) United States Patent
Chipman

(10) Patent No.: US 10,509,779 B2
(45) Date of Patent: Dec. 17, 2019

(54) SELF-CLEANING TOKEN VAULT

(71) Applicant: VISA INTERNATIONAL SERVICE ASSOCIATION, San Francisco, CA (US)

(72) Inventor: Tommy Chipman, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 128 days.

(21) Appl. No.: 15/265,282

(22) Filed: Sep. 14, 2016

(65) Prior Publication Data

US 2018/0075081 A1 Mar. 15, 2018

(51) Int. Cl.
*G06F 16/23* (2019.01)
*G06Q 20/38* (2012.01)
(Continued)

(52) U.S. Cl.
CPC ........ *G06F 16/2365* (2019.01); *G06F 16/955* (2019.01); *G06Q 20/367* (2013.01);
(Continued)

(58) Field of Classification Search
CPC ............. G06Q 20/367; G06Q 20/3672; G06Q 20/3674; G06Q 20/3676; G06Q 20/3678;
(Continued)

(56) References Cited

U.S. PATENT DOCUMENTS 5,613,012 A 3/1997 Hoffman
5,781,438 A 7/1998 Lee
(Continued)

FOREIGN PATENT DOCUMENTS

EP 2156397 A1 2/2010
WO 2001035304 A1 5/2001
(Continued)

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
(Continued)

*Primary Examiner* — Jesse P Frumkin
(74) *Attorney, Agent, or Firm* — Kilpatrick Townsend & Stockton LLP

(57) ABSTRACT

Embodiments are directed to a self-cleaning token vault for managing tokens generated on behalf of a resource provider. The generated tokens may be stored at the token vault. Embodiments provide a token manager (which can be embodied in the token vault or provided as a separate module) that continuously monitor the token vault for expired or redundant tokens. The token manager may enable the resource provider to assign level flags to the tokens and assign level values to the level flags. The level value may indicate an importance or a use characteristic of the token. Upon identifying tokens that are no longer necessary, the self-cleaning token vault or the token manager may automatically remove the tokens from the token vault.

15 Claims, 6 Drawing Sheets

(51) Int. Cl.
  *G06Q 20/36* (2012.01)
  *G06F 16/955* (2019.01)
(52) U.S. Cl.
  CPC ....... *G06Q 20/3672* (2013.01); *G06Q 20/385* (2013.01); *G06Q 20/3825* (2013.01)
(58) Field of Classification Search
  CPC .. G06Q 20/385; G06F 16/2365; G06F 16/955
  See application file for complete search history.

(56) References Cited

U.S. PATENT DOCUMENTS

| | | | |
|---|---|---|---|
| 5,883,810 A | 3/1999 | Franklin | |
| 5,953,710 A | 9/1999 | Fleming | |
| 5,956,699 A | 9/1999 | Wong | |
| 6,000,832 A | 12/1999 | Franklin | |
| 6,014,635 A | 1/2000 | Harris | |
| 6,044,360 A | 3/2000 | Picciallo | |
| 6,163,771 A | 12/2000 | Walker | |
| 6,227,447 B1 | 5/2001 | Campisano | |
| 6,236,981 B1 | 5/2001 | Hill | |
| 6,267,292 B1 | 7/2001 | Walker | |
| 6,327,578 B1 | 12/2001 | Linehan | |
| 6,341,724 B2 | 1/2002 | Campisano | |
| 6,385,596 B1 | 5/2002 | Wiser | |
| 6,422,462 B1 | 7/2002 | Cohen | |
| 6,425,523 B1 | 7/2002 | Shem Ur | |
| 6,592,044 B1 | 7/2003 | Wong | |
| 6,636,833 B1 | 10/2003 | Flitcroft | |
| 6,748,367 B1 | 6/2004 | Lee | |
| 6,805,287 B2 | 10/2004 | Bishop | |
| 6,879,965 B2 | 4/2005 | Fung | |
| 6,891,953 B1 | 5/2005 | DeMello | |
| 6,901,387 B2 | 5/2005 | Wells | |
| 6,931,382 B2 | 8/2005 | Laage | |
| 6,938,019 B1 | 8/2005 | Uzo | |
| 6,941,285 B2 | 9/2005 | Sarcanin | |
| 6,980,670 B1 | 12/2005 | Hoffman | |
| 6,990,470 B2 | 1/2006 | Hogan | |
| 6,991,157 B2 | 1/2006 | Bishop | |
| 7,051,929 B2 | 5/2006 | Li | |
| 7,069,249 B2 | 6/2006 | Stolfo | |
| 7,103,576 B2 | 9/2006 | Mann, III | |
| 7,113,930 B2 | 9/2006 | Eccles | |
| 7,136,835 B1 | 11/2006 | Flitcroft | |
| 7,177,835 B1 | 2/2007 | Walker | |
| 7,177,848 B2 | 2/2007 | Hogan | |
| 7,194,437 B1 | 3/2007 | Britto | |
| 7,209,561 B1 | 4/2007 | Shankar et al. | |
| 7,264,154 B2 | 9/2007 | Harris | |
| 7,287,692 B1 | 10/2007 | Patel | |
| 7,292,999 B2 | 11/2007 | Hobson | |
| 7,350,230 B2 | 3/2008 | Forrest | |
| 7,353,382 B2 | 4/2008 | Labrou | |
| 7,379,919 B2 | 5/2008 | Hogan | |
| RE40,444 E | 7/2008 | Linehan | |
| 7,415,443 B2 | 8/2008 | Hobson | |
| 7,444,676 B1 | 10/2008 | Asghari-Kamrani | |
| 7,469,151 B2 | 12/2008 | Khan | |
| 7,548,889 B2 | 6/2009 | Bhambri | |
| 7,567,934 B2 | 7/2009 | Flitcroft | |
| 7,567,936 B1 | 7/2009 | Peckover | |
| 7,571,139 B1 | 8/2009 | Giordano | |
| 7,571,142 B1 | 8/2009 | Flitcroft | |
| 7,580,898 B2 | 8/2009 | Brown | |
| 7,584,153 B2 | 9/2009 | Brown | |
| 7,593,896 B1 | 9/2009 | Flitcroft | |
| 7,606,560 B2 | 10/2009 | Labrou | |
| 7,627,531 B2 | 12/2009 | Breck | |
| 7,627,895 B2 | 12/2009 | Gifford | |
| 7,650,314 B1 | 1/2010 | Saunders | |
| 7,685,037 B2 | 3/2010 | Reiners | |
| 7,702,578 B2 | 4/2010 | Fung | |
| 7,707,120 B2 | 4/2010 | Dominguez | |
| 7,712,655 B2 | 5/2010 | Wong | |
| 7,734,527 B2 | 6/2010 | Uzo | |
| 7,753,265 B2 | 7/2010 | Harris | |
| 7,770,789 B2 | 8/2010 | Oder, II | |
| 7,784,685 B1 | 8/2010 | Hopkins, III | |
| 7,793,851 B2 | 9/2010 | Mullen | |
| 7,801,826 B2 | 9/2010 | Labrou | |
| 7,805,376 B2 | 9/2010 | Smith | |
| 7,805,378 B2 | 9/2010 | Berardi | |
| 7,818,264 B2 | 10/2010 | Hammad | |
| 7,828,220 B2 | 11/2010 | Mullen | |
| 7,835,960 B2 | 11/2010 | Breck | |
| 7,841,523 B2 | 11/2010 | Oder | |
| 7,841,539 B2 | 11/2010 | Hewton | |
| 7,844,550 B2 | 11/2010 | Walker | |
| 7,848,980 B2 | 12/2010 | Carlson | |
| 7,849,020 B2 | 12/2010 | Johnson | |
| 7,853,529 B1 | 12/2010 | Walker | |
| 7,853,995 B2 | 12/2010 | Chow | |
| 7,865,414 B2 | 1/2011 | Fung | |
| 7,873,579 B2 | 1/2011 | Hobson | |
| 7,873,580 B2 | 1/2011 | Hobson | |
| 7,890,393 B2 | 2/2011 | Talbert | |
| 7,891,563 B2 | 2/2011 | Oder, II | |
| 7,896,238 B2 | 3/2011 | Fein | |
| 7,908,216 B1 | 3/2011 | Davis et al. | |
| 7,922,082 B2 | 4/2011 | Muscato | |
| 7,931,195 B2 | 4/2011 | Mullen | |
| 7,937,324 B2 | 5/2011 | Patterson | |
| 7,938,318 B2 | 5/2011 | Fein | |
| 7,954,705 B2 | 6/2011 | Mullen | |
| 7,959,076 B1 | 6/2011 | Hopkins, III | |
| 7,996,288 B1 | 8/2011 | Stolfo | |
| 8,025,223 B2 | 9/2011 | Saunders | |
| 8,046,256 B2 | 10/2011 | Chien | |
| 8,060,448 B2 | 11/2011 | Jones | |
| 8,060,449 B1 | 11/2011 | Zhu | |
| 8,074,877 B2 | 12/2011 | Mullen | |
| 8,074,879 B2 | 12/2011 | Harris | |
| 8,082,210 B2 | 12/2011 | Hansen | |
| 8,095,113 B2 | 1/2012 | Kean | |
| 8,104,679 B2 | 1/2012 | Brown | |
| RE43,157 E | 2/2012 | Bishop | |
| 8,109,436 B1 | 2/2012 | Hopkins, III | |
| 8,121,942 B2 | 2/2012 | Carlson | |
| 8,121,956 B2 | 2/2012 | Carlson | |
| 8,126,449 B2 | 2/2012 | Beenau | |
| 8,132,723 B2 | 3/2012 | Hogg et al. | |
| 8,171,525 B1 | 5/2012 | Pelly | |
| 8,175,973 B2 | 5/2012 | Davis et al. | |
| 8,190,523 B2 | 5/2012 | Patterson | |
| 8,196,131 B1 * | 6/2012 | von Behren | G06Q 20/367 705/64 |
| 8,196,813 B2 | 6/2012 | Vadhri | |
| 8,205,791 B2 | 6/2012 | Randazza | |
| 8,219,489 B2 | 7/2012 | Patterson | |
| 8,224,702 B2 | 7/2012 | Mengerink | |
| 8,225,385 B2 | 7/2012 | Chow | |
| 8,229,852 B2 | 7/2012 | Carlson | |
| 8,265,993 B2 | 9/2012 | Chien | |
| 8,280,777 B2 | 10/2012 | Mengerink | |
| 8,281,991 B2 | 10/2012 | Wentker et al. | |
| 8,328,095 B2 | 12/2012 | Oder, II | |
| 8,336,088 B2 | 12/2012 | Raj et al. | |
| 8,346,666 B2 | 1/2013 | Lindelsee et al. | |
| 8,376,225 B1 | 2/2013 | Hopkins, III | |
| 8,380,177 B2 | 2/2013 | Laracey | |
| 8,387,873 B2 | 3/2013 | Saunders | |
| 8,401,539 B2 | 3/2013 | Beenau | |
| 8,401,898 B2 | 3/2013 | Chien | |
| 8,402,555 B2 | 3/2013 | Grecia | |
| 8,403,211 B2 | 3/2013 | Brooks | |
| 8,412,623 B2 | 4/2013 | Moon | |
| 8,412,837 B1 | 4/2013 | Emigh | |
| 8,417,642 B2 | 4/2013 | Oren | |
| 8,447,699 B2 | 5/2013 | Batada | |
| 8,453,223 B2 | 5/2013 | Svigals | |
| 8,453,925 B2 | 6/2013 | Fisher | |
| 8,458,487 B1 | 6/2013 | Palgon | |
| 8,484,134 B2 | 7/2013 | Hobson | |

(56) References Cited

U.S. PATENT DOCUMENTS

| | | |
|---|---|---|
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,433,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,043,609 B2 | 5/2015 | Caiman |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,779,220 B1 * | 10/2017 | Kronrod ............. G06F 21/10 |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0163787 A1 * | 8/2003 | Hay ............. G06Q 20/367 |
| | | 715/248 |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 * | 12/2009 | Brabson ............. G06Q 20/24 |
| | | 235/380 |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |

(56) References Cited

U.S. PATENT DOCUMENTS

| | | |
|---|---|---|
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0079572 A1* | 3/2012 | Tsai .................. G06F 21/33 726/6 |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder ("J.D."), II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |

(56) References Cited

U.S. PATENT DOCUMENTS

| | | | |
|---|---|---|---|
| 2013/0332344 A1 | 12/2013 | Weber | |
| 2013/0339253 A1 | 12/2013 | Sincai | |
| 2013/0346305 A1 | 12/2013 | Mendes | |
| 2013/0346314 A1 | 12/2013 | Mogollon | |
| 2014/0007213 A1 | 1/2014 | Sanin | |
| 2014/0013106 A1 | 1/2014 | Redpath | |
| 2014/0013114 A1 | 1/2014 | Redpath | |
| 2014/0013452 A1 | 1/2014 | Aissi et al. | |
| 2014/0019352 A1 | 1/2014 | Shrivastava | |
| 2014/0025581 A1 | 1/2014 | Calman | |
| 2014/0025585 A1 | 1/2014 | Calman | |
| 2014/0025958 A1 | 1/2014 | Calman | |
| 2014/0032417 A1 | 1/2014 | Mattsson | |
| 2014/0032418 A1 | 1/2014 | Weber | |
| 2014/0040137 A1 | 2/2014 | Carlson | |
| 2014/0040139 A1 | 2/2014 | Brudnicki | |
| 2014/0040144 A1 | 2/2014 | Plomske | |
| 2014/0040145 A1 | 2/2014 | Ozvat | |
| 2014/0040148 A1 | 2/2014 | Ozvat | |
| 2014/0040628 A1 | 2/2014 | Fort | |
| 2014/0041018 A1 | 2/2014 | Bomar | |
| 2014/0046853 A1 | 2/2014 | Spies | |
| 2014/0047551 A1 | 2/2014 | Nagasundaram et al. | |
| 2014/0052532 A1 | 2/2014 | Tsai | |
| 2014/0052620 A1 | 2/2014 | Rogers | |
| 2014/0052637 A1 | 2/2014 | Jooste | |
| 2014/0068706 A1 | 3/2014 | Aissi | |
| 2014/0074637 A1 | 3/2014 | Hammad | |
| 2014/0108172 A1 | 4/2014 | Weber et al. | |
| 2014/0114857 A1 | 4/2014 | Griggs et al. | |
| 2014/0143137 A1 | 5/2014 | Carlson | |
| 2014/0164243 A1 | 6/2014 | Aabye et al. | |
| 2014/0188586 A1 | 7/2014 | Carpenter et al. | |
| 2014/0294701 A1 | 10/2014 | Dai et al. | |
| 2014/0297534 A1 | 10/2014 | Patterson | |
| 2014/0310183 A1 | 10/2014 | Weber | |
| 2014/0324690 A1 | 10/2014 | Allen et al. | |
| 2014/0330721 A1 | 11/2014 | Wang | |
| 2014/0330722 A1 | 11/2014 | Laxminarayanan et al. | |
| 2014/0331265 A1 | 11/2014 | Mozell et al. | |
| 2014/0337236 A1 | 11/2014 | Wong et al. | |
| 2014/0344153 A1* | 11/2014 | Raj | G06Q 20/3821 705/44 |
| 2014/0372308 A1 | 12/2014 | Sheets | |
| 2015/0019443 A1 | 1/2015 | Sheets et al. | |
| 2015/0032625 A1* | 1/2015 | Dill | G06Q 20/385 705/44 |
| 2015/0032626 A1 | 1/2015 | Dill | |
| 2015/0032627 A1* | 1/2015 | Dill | G06Q 20/385 705/44 |
| 2015/0046338 A1 | 2/2015 | Laxminarayanan | |
| 2015/0046339 A1 | 2/2015 | Wong et al. | |
| 2015/0052064 A1 | 2/2015 | Karpenko et al. | |
| 2015/0081544 A1 | 3/2015 | Wong et al. | |
| 2015/0088756 A1 | 3/2015 | Makhotin et al. | |
| 2015/0106239 A1 | 4/2015 | Gaddam et al. | |
| 2015/0112870 A1 | 4/2015 | Nagasundaram et al. | |
| 2015/0112871 A1 | 4/2015 | Kumnick | |
| 2015/0120472 A1 | 4/2015 | Aabye et al. | |
| 2015/0127529 A1 | 5/2015 | Makhotin et al. | |
| 2015/0127547 A1 | 5/2015 | Powell et al. | |
| 2015/0140960 A1 | 5/2015 | Powell et al. | |
| 2015/0142673 A1 | 5/2015 | Nelsen et al. | |
| 2015/0161597 A1 | 6/2015 | Subramanian et al. | |
| 2015/0178724 A1 | 6/2015 | Ngo et al. | |
| 2015/0180836 A1 | 6/2015 | Wong et al. | |
| 2015/0186864 A1 | 7/2015 | Jones et al. | |
| 2015/0193222 A1 | 7/2015 | Pirzadeh et al. | |
| 2015/0195133 A1 | 7/2015 | Sheets et al. | |
| 2015/0199679 A1 | 7/2015 | Palanisamy et al. | |
| 2015/0199689 A1 | 7/2015 | Kumnick et al. | |
| 2015/0220917 A1 | 8/2015 | Aabye et al. | |
| 2015/0254665 A1 | 9/2015 | Bondesen et al. | |
| 2015/0269566 A1 | 9/2015 | Gaddam et al. | |
| 2015/0312038 A1 | 10/2015 | Palanisamy | |
| 2015/0319158 A1 | 11/2015 | Kumnick | |
| 2015/0319162 A1 | 11/2015 | Ollikainen et al. | |
| 2015/0332262 A1 | 11/2015 | Lingappa | |
| 2015/0339663 A1* | 11/2015 | Lopreiato | G06Q 20/3278 705/67 |
| 2015/0356560 A1 | 12/2015 | Shastry et al. | |
| 2015/0371031 A1 | 12/2015 | Ueno et al. | |
| 2015/0379508 A1 | 12/2015 | Van | |
| 2016/0028550 A1 | 1/2016 | Gaddam et al. | |
| 2016/0042263 A1 | 2/2016 | Gaddam et al. | |
| 2016/0065370 A1 | 3/2016 | Le Saint et al. | |
| 2016/0092696 A1 | 3/2016 | Guglani et al. | |
| 2016/0092872 A1 | 3/2016 | Prakash et al. | |
| 2016/0103675 A1 | 4/2016 | Aabye et al. | |
| 2016/0119296 A1 | 4/2016 | Laxminarayanan et al. | |
| 2016/0140545 A1 | 5/2016 | Flurscheim et al. | |
| 2016/0148197 A1 | 5/2016 | Dimmick | |
| 2016/0148212 A1 | 5/2016 | Dimmick | |
| 2016/0171479 A1 | 6/2016 | Prakash et al. | |
| 2016/0173483 A1 | 6/2016 | Wong et al. | |
| 2016/0210628 A1 | 7/2016 | McGuire | |
| 2016/0218875 A1 | 7/2016 | Le Saint et al. | |
| 2016/0224976 A1 | 8/2016 | Basu | |
| 2016/0224977 A1 | 8/2016 | Sabba et al. | |
| 2016/0232527 A1 | 8/2016 | Patterson | |
| 2016/0239842 A1 | 8/2016 | Cash et al. | |
| 2016/0350746 A1* | 12/2016 | Johnson | G06Q 20/385 |
| 2017/0046696 A1 | 2/2017 | Powell et al. | |
| 2017/0103387 A1 | 4/2017 | Weber | |
| 2017/0220818 A1 | 8/2017 | Nagasundaram et al. | |
| 2017/0228723 A1 | 8/2017 | Taylor | |

FOREIGN PATENT DOCUMENTS

| | | |
|---|---|---|
| WO | 2001035304 A9 | 5/2001 |
| WO | 2004-031888 A2 | 4/2004 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Stubbs et al., U.S. Appl. No. 62/103,522 (unpublished), Methods and Systems for Wallet Provider Provisioning filed Jan. 14, 2015.

Flurscheim et al., U.S. Appl. No. 62/108,403 (unpublished), Wearables With NFC HCE filed Jan. 27, 2015.

Kinagi, U.S. Appl. No. 62/117,291 (unpublished), Token and Cryptogram Using Transaction Specific Information filed Feb. 17, 2015.

Galland et al. U.S. Appl. No. 62/128,709 (unpublished), Tokenizing Transaction Amounts filed Mar. 5, 2015.

(56) References Cited

OTHER PUBLICATIONS

Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Lopez, et al., U.S. Appl. No. 15/462,658 (Unpublished), Replacing Token on a Multi-Token User Device, filed Mar. 17, 2017.
International Search Report and Written Opinion dated Dec. 22, 2017 in PCT Application PCT/US2017/051004; 12 pages.
EP17851379.2, "Extended European Search Report", dated Jul. 10, 2019, 9 pages.

\* cited by examiner

SELF-CLEANING TOKEN VAULT

BACKGROUND

A token is an identifier that may be used to replace an actual account identifier. The token can be presented to a resource provider to access or obtain goods or services provided by the resource provider using the account represented by the token. In case the tokens are compromised, the underlying account may still be protected from attacks or fraudulent use.

In conventional systems, all generated tokens including tokens that are not-in-use or are expired, are stored indefinitely. Storing unused tokens results in unnecessary usage of memory space of a token vault and reflects as additional cost to the entity holding the tokens. In addition, since there is a limited number of tokens that can be generated, unused tokens unnecessarily use up this limited number. Conventional systems are also unable to add contextual value (e.g. an importance level, a level flag, etc.) to the token that is being generated.

Embodiments of the invention address these and other problems, individually and collectively.

SUMMARY

The present disclosure relates generally to a self-cleaning token vault. Embodiments provide a token manager (which can be embodied in the token vault or provided as a separate module) that monitor the token vault for expired or redundant tokens. Upon identifying tokens that are no longer necessary, the token manager can automatically remove the tokens from the token vault.

According to various embodiments, tokens may be generated on behalf of (e.g. in response to a request from) a resource provider. The generated tokens may be stored at the token vault. The token manager may enable the resource provider to assign level flags to the tokens and assign level values to the level flags. The level value may indicate an importance or a use characteristic of the token. For example, a level value of 1 may indicate that the token is of great importance and should be stored indefinitely. Such token may be used frequently. On the other hand, a level value of 5 may indicate that the token is not important and should be deleted upon being used a number of times or upon the expiration of a certain amount of time. Such token may be used infrequently.

Embodiments may provide a method performed by a computer system. The computer system may receive, over a first network communications channel, a plurality of token generation request messages from one or more token requestors. The computer system may cause a plurality of tokens to be generated and stored in a database. A first token and a second token are generated, respectively, in response to a first token generation request message and a second token generation request message. The first token and second token are stored in the database after being generated. The computer system may associate a first level flag with the first token and a second level flag with the second token. A level flag has one of a plurality of level values. A level value indicates a respective set of one or more rules for managing an associated token in the database. The first level flag and the second level flag have different level values. The computer system may store the first level flag in association with the first token and the second level flag in association with the second token. The computer system may also manage the plurality of tokens stored in the database using the level values of the level flags corresponding to the tokens. The managing may include identifying that the first token has expired based on a first set of one or more rules corresponding to a first level value of the first level flag; automatically removing the first token from the database upon identifying that the first token has expired; and identifying that the second token has not expired based on a second set of one or more rules corresponding to a second level value of the second level flag.

Other embodiments are directed to systems and computer readable media associated with methods described herein.

A better understanding of the nature and advantages of embodiments of the present invention may be gained with reference to the following detailed description and the accompanying drawings.

DETAILED DESCRIPTION

Figure 1:
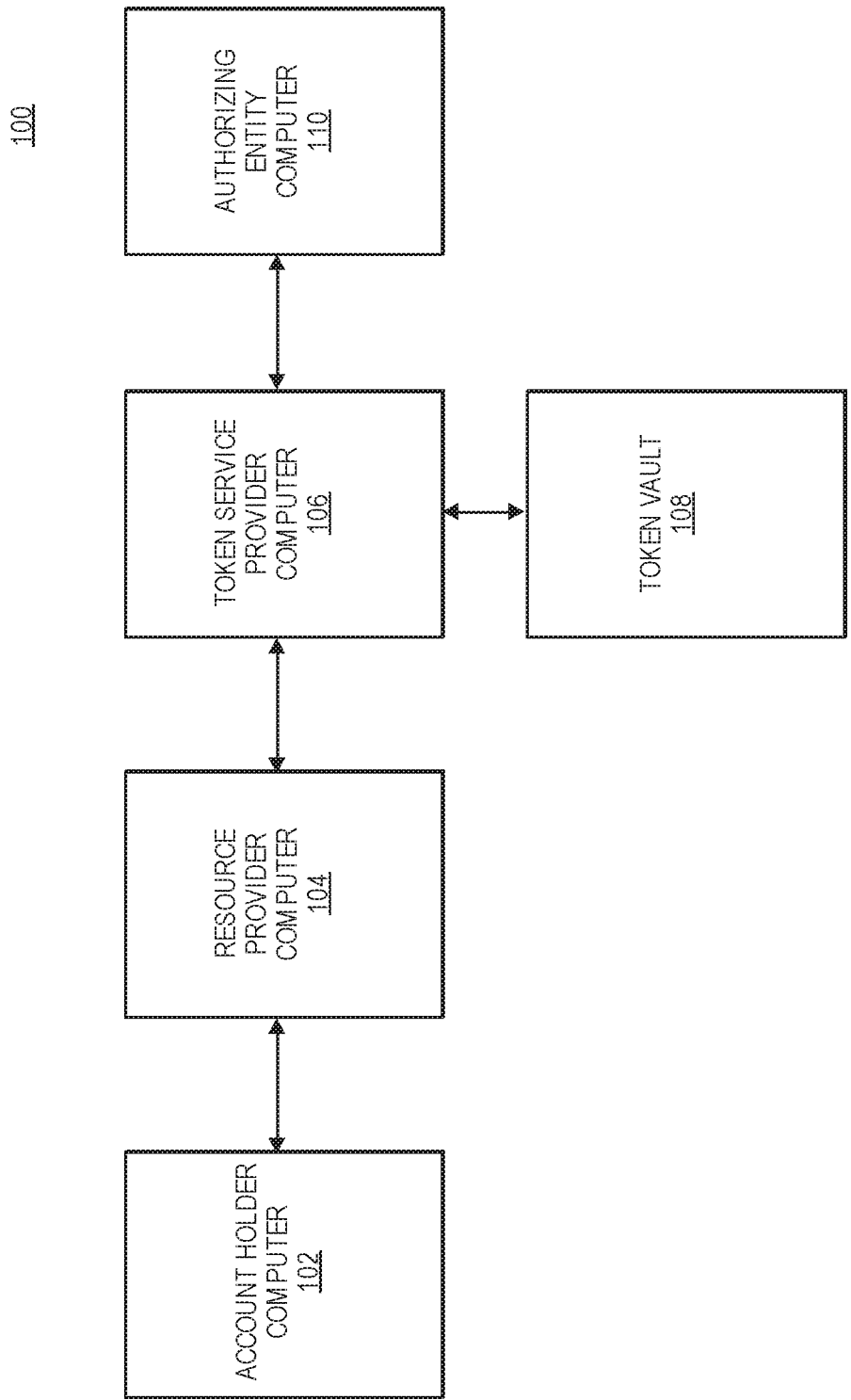
FIG. 1 is a block diagram of a conventional tokenization environment for token generation and token storage.

The present disclosure relates generally to a token manager for managing tokens that are stored at a token vault. According to some embodiments, a token requestor (e.g. a user or a resource provider such as a merchant) can access the token manager and can remove tokens (e.g. expired tokens) from the token vault using the token manager. For example, the token manager may allow users to assign an importance level (e.g. a level flag) to the tokens and define a corresponding set of rules for each level. Each flag may be indicative of the relative use characteristics of the corresponding token compared to other tokens. The tokens may be treated differently based on the relative use characteristics. In some embodiments, the token manager may assign the importance level (e.g. the level flag) based on information/instruction received from the merchant. In some embodiments, the token rules applied to the token may be executed automatically by the token manager to remove expired tokens from the token vault.

For example, users (or the token manager) may apply a number 1 through 5 (e.g. the flag value is 1, 2, 3, 4 or 5) to an existing or newly created token. The tokens may be rated 1 being the least important and 5 the most important. When rules associated with the rating 1 are applied to the tokens, tokens may be automatically deleted after the first use or after a predetermined amount of time (e.g. 30 days, or the merchant's return policy for a guest to the website). When rules associated with the rating 5 are applied to the tokens, tokens may be saved indefinitely (i.e. no action taken). In some embodiments, the token manager may continuously monitor the token vault and delete the expired tokens periodically. Since there is a finite number of tokens that can be generated, deleted tokens may be recycled and reused. That is, in response to a new token request message, a recycled token may be assigned to a different account identifier, provided to the user and stored at the token vault.

Embodiments allow the users to keep their number of tokens lower, thus reducing concerns (e.g. cost, security concerns, duplicated tokens, and surprise charges) associated with their token portfolio. Embodiments further allow the users to automatically set logic for token creation and deletion processes using the token manager. Embodiments further allow the resource provider to add contextual value to the interaction with the account holder and incorporate the contextual value in the stored token data.

Before discussing specific embodiments and examples, some descriptions of terms used herein are provided below.

A "server computer" may typically be a powerful computer or cluster of computers. For example, the server computer can be a large mainframe, a minicomputer cluster, or a group of servers functioning as a unit. In one example, a server computer may be a database server coupled to a Web server. Data transfer and other communications between components such as computers may occur via any suitable wired or wireless network, such as the Internet or private networks. The server computer may be associated with an entity such as a resource provider, a database (e.g. an information database, an application database, an entertainment database), an transaction processing entity or an authorizing entity.

An "account holder" may hold an account. An "account holder" may include an individual or an entity that uses a system. An account holder may be associated with one or more accounts and/or user devices. In some cases, the account holder may also be referred to as a user or a consumer.

An "authorizing entity" (e.g. an issuer) can include an entity that authorizes a request. In some embodiments, an authorizing entity is an issuer that issues an account. The account (which may be associated with one or more user devices) may refer to any suitable account including payment accounts (e.g. a credit card account, a checking account, a savings account, a merchant account assigned to a consumer, a prepaid account, etc.), an employment account, an online account (e.g. email account, database subscription account, etc.).

A "resource provider" may be an entity that can provide a resource such as goods, services, information, and/or access. Examples of resource providers includes merchants, data providers, transit agencies, governmental entities, venue and dwelling operators, etc.

An "account identifier" or "user account identifier" may include any suitable information associated with an account of a user which identifies the account. Such information may be directly related to the account or may be derived from information related to the account. For example, an account identifier may include an account number, an employment identification number, a virtual account identifier, a primary account number (PAN), a token, a service code, a CVV (card verification value), a dCVV (dynamic card verification value), CVV2 (Card Verification Value 2), CVC3 card verification values, an expiration date, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). The PAN may be a variable length, (e.g. 13 to 19-digit) industry standard-compliant account number that is generated within account ranges associated with a Bank Identification Number (BIN) by an issuer.

A "token" may include an identifier for an account that is a substitute for account data, such as an account number. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing server computers. In some embodiments, a token may be used in place of an account number to initiate, authorize, settle or resolve a transaction or represent the original credential in other systems where the original credential would typically be provided. In some embodiments, a token value may be generated such that the recovery of the original account number or other account identifier from the token value may not be computationally derived. Further, in some embodiments, the token format may be configured to allow the entity receiving the token to identify it as a token and recognize the entity that issued the token.

FIG. 1 is a block diagram of a conventional tokenization environment 100 for token generation and token storage. An account holder computer 102 may engage in a transaction with a resource provider 104 (e.g. a merchant, a building operator, a virtual database managing system). The account holder computer 102 may provide an account identifier to the resource provider computer 104. The resource provider computer 104 may generate a token request message and include the account identifier in the token request message. The resource provider computer 104 may send the token request message to a token service provider computer 106. The token service provider computer 106 may confirm with an authorizing entity 110 that the account identified by the account identifier is cleared for tokenization (e.g. the account is in good standing). The token service provider computer 106 may then generate a token corresponding to the account identifier and store a mapping between the token and the account identifier in the token vault 108. The token service provider computer 106 may send the generated token to the resource provider computer 104 so that the resource provider computer 104 can store the generated token in their system and use the token for future transactions.

With time, the number of tokens generated on behalf of the resource provider computer 104 (e.g. for various users transacting with the resource provider computer 104) may increase and the maintenance burdens associated with storing and managing the tokens may create various inefficiencies (e.g. storage inefficiencies, costs associated with storage and maintenance, and the like). Accordingly, it may be beneficial to allow the resource provider computer 104 to manage the tokens (e.g. the tokens generated for the resource provider computer 104) in the token vault 108 by assigning a level flag to the tokens. In some embodiments, the level flag may be included in the initial token generation request message such that a token may be associated with the level flag immediately upon generation. In other embodiments, the level flag may be assigned at a later time to previously generated tokens. According to various embodiments, the level flag may have a level value which is associated with (or indicative of) a set of rules. The set of rules may determine how long a token is to be stored in the token vault.

For example, the level value of a level flag may be a number ranging 1 to 3. Level value 1 may be associated with at least one rule that requires the tokens to be deleted upon first use. Level value 2 may be associated with at least one rule that requires the tokens to be stored for a predetermined amount of time (e.g. 30 days, 6 months, during the return policy period or during the warranty period, etc.). Level value 3 may be associated with at least one rule that requires the tokens to be stored indefinitely. One of ordinary skill in the art will appreciate that the foregoing level flag values are provided for illustration purposes and any other values or any number of alternative values with alternative configurations may be used in connection with the present invention.

I. Token Request and Token Generation Processes

Figure 2:
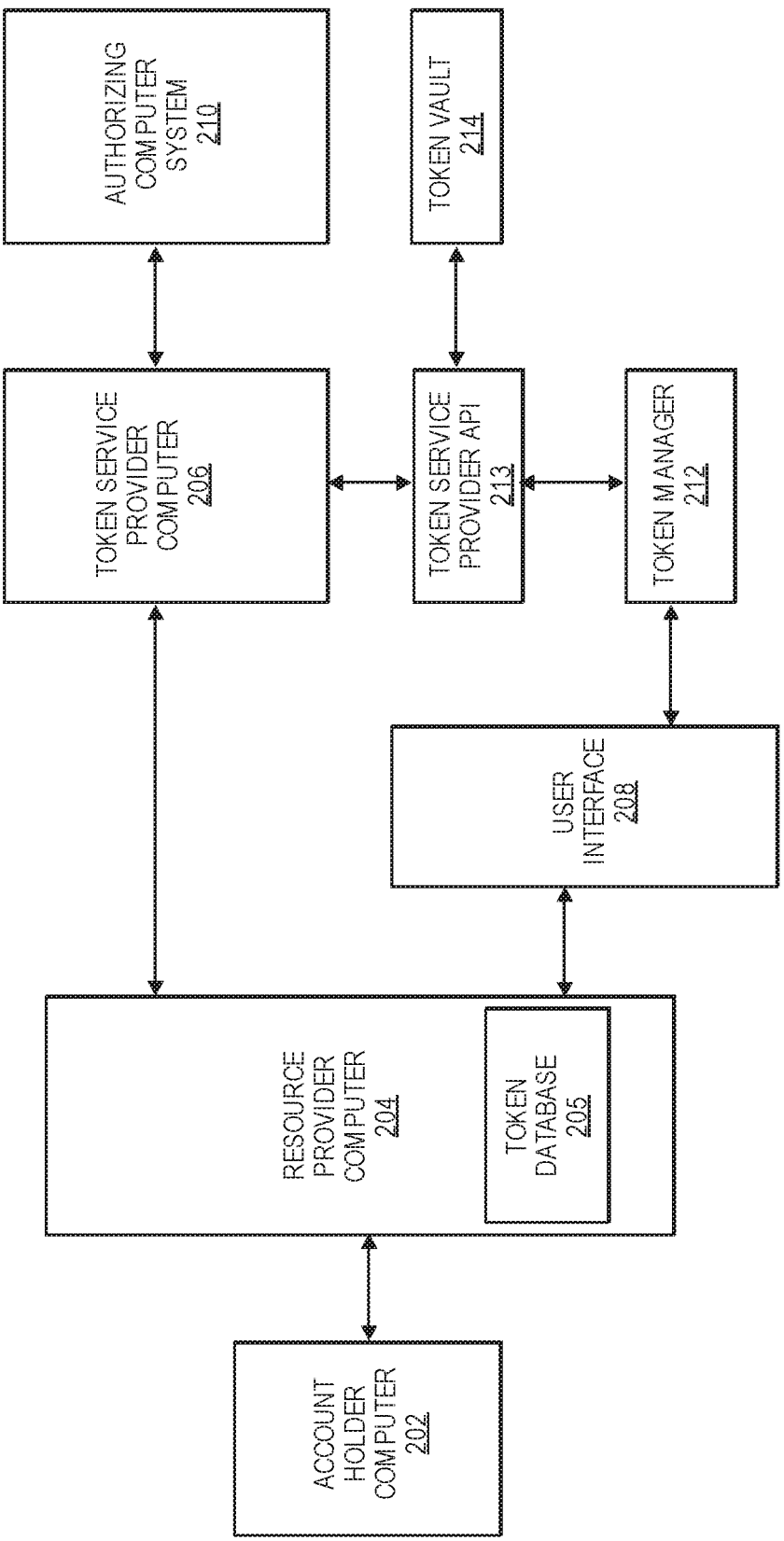
FIG. 2 is a block diagram of an exemplary tokenization environment including a token manager for managing generated tokens, according to an embodiment of the invention.

FIG. 2 is a block diagram of an exemplary tokenization environment 200 for token generation, token management and token storage according to an embodiment of the present invention. An account holder computer 202 may engage in a transaction with a resource provider computer 204 (e.g. a merchant). The account holder computer 202 may provide an account identifier (e.g. a user account identifier) to the resource provider computer 204. The resource provider computer 204 may generate a token request message and include the account identifier in the token request message. The resource provider computer 204 may send the token request message to a token service provider computer 206. The token service provider computer 206 may confirm with an authorizing entity 210 that the account identified by the account identifier is cleared for tokenization (e.g. the account is in good standing). The token service provider computer 206 may then generate a token corresponding to the account identifier and store the token as well as a mapping between the token and the account identifier in the token vault 214. According to various embodiments, additional token data such as an indication of when each token has been generated and how many times (or the exact times when) each token has been used in a transaction may also be stored at the token vault 214.

Although many of the exemplary transactions described herein may relate to financial transactions, embodiments of the invention are not limited to financial transactions. For example, embodiments of the invention can be used in situations where access to a resource (e.g., such as access to a service) is desired. Accordingly, the generated token may be used to conduct transactions such as payment transactions to purchase goods or services, or access transactions to gain access to physical locations (e.g. a building) or to gain access to data stored at a virtual location (e.g. database supervised by a government agency). In case of an access token providing access to a physical location, a building operator system may be the resource provider that wishes to manage the generated tokens. In case of an access token providing access to a database, a system operator or a security department of the government agency may be the resource provider that wishes to manage the generated tokens.

Referring back to FIG. 2, the token service provider computer 206 may send the generated token to the resource provider computer 204 so that the resource provider computer 204 can store the generated token in their system and use the token for future transactions with the account holder computer 202. For example, the resource provider computer 204 can store the generated token at a local token database 205 without having to store the actual account identifier of the account holder computer 202. Accordingly, the resource provider computer 204 may not be required to comply with rules of a regulatory body (e.g. the resource provider computer 204 may not be required to be Payment Card Industry (PCI) compliant).

The exemplary tokenization environment 200 may also include a token manager 212 for managing the tokens stored in the token vault 214. The token service provider computer 206 and/or the resource provider computer 204 may manage the tokens stored in the token vault 214 via the token manager 212. A token service provider application programming interface (API) 213 may be provided between the token manager 212 and the token vault 214. The token service provider API 213 may enable the token manager 212 to execute the token manager's rules and actions. The resource provider computer 204 may interact with the token manager 212 through the user interface 208.

The token manager 212 may continuously monitor the token vault 214 to identify expired tokens (based on the rules set by the resource provider computer 204) and remove (or request the token vault 214 to delete) the expired tokens. As provided above, the token service provider computer 206 may also provide a copy of the generated tokens to the resource provider computer 204 who requested the token. The resource provider computer 204 may have its own database 205 where the generated tokens are stored. According to various embodiments, the token manager 212 may access the token database 205 of the resource provider computer 204 to identify expired tokens and remove (or request the resource provider computer 204 to remove) the expired tokens. Alternatively, the token manager 212 may provide, to the resource provider computer 204, a list of the expired tokens that are identified in the token vault 214. The resource provider computer 204 may take the necessary steps to remove the tokens identified as expired or redundant by the token manager 212 from the local token database 205 of the resource provider computer 204.

According to various embodiments, the token manager 212 may identify expired tokens based on level values of level flags associated with the tokens. As provided above, the resource provider computer 204 may assign a level flag to a token. In some embodiments, the resource provider computer 204 may include the level flag in the token request message sent to the token service provider computer 206. Accordingly, when the token service provider computer 206 generates the token, the token service provider computer 206 also associates the level flag with the newly generated token. In some embodiments, the level flag may be stored in connection with the token at the token vault 214. In some embodiments, the resource provider computer 204 may assign the level flag at a later time (e.g. sometime after a token has been generated) to a previously generated token that is stored at the token vault 214. For example, the resource provider computer 204 may interact with the token vault 214 through the user interface 208 to select a token and to assign a level flag to the selected token. The level flag may then be stored in connection with the token at the token vault 214.

Embodiments may allow the resource provider computer 204 and/or the account holder computer 202 to customize properties of the stored tokens via the token manager 212. The customizable properties are not limited to the lifespan of the generated tokens and may include additional properties such as modifying authorized users associated with the token, flagging the token for potential fraudulent use and the like. Accordingly, an expired token, as used herein, may refer to a token associated with a level flag whose value indicates that the token no longer satisfies the rule that is associated with the value of its level flag. The properties may be customized by associating various rules with the level values of level flags, as described below.

A. The Token Service Platform

Figure 3:
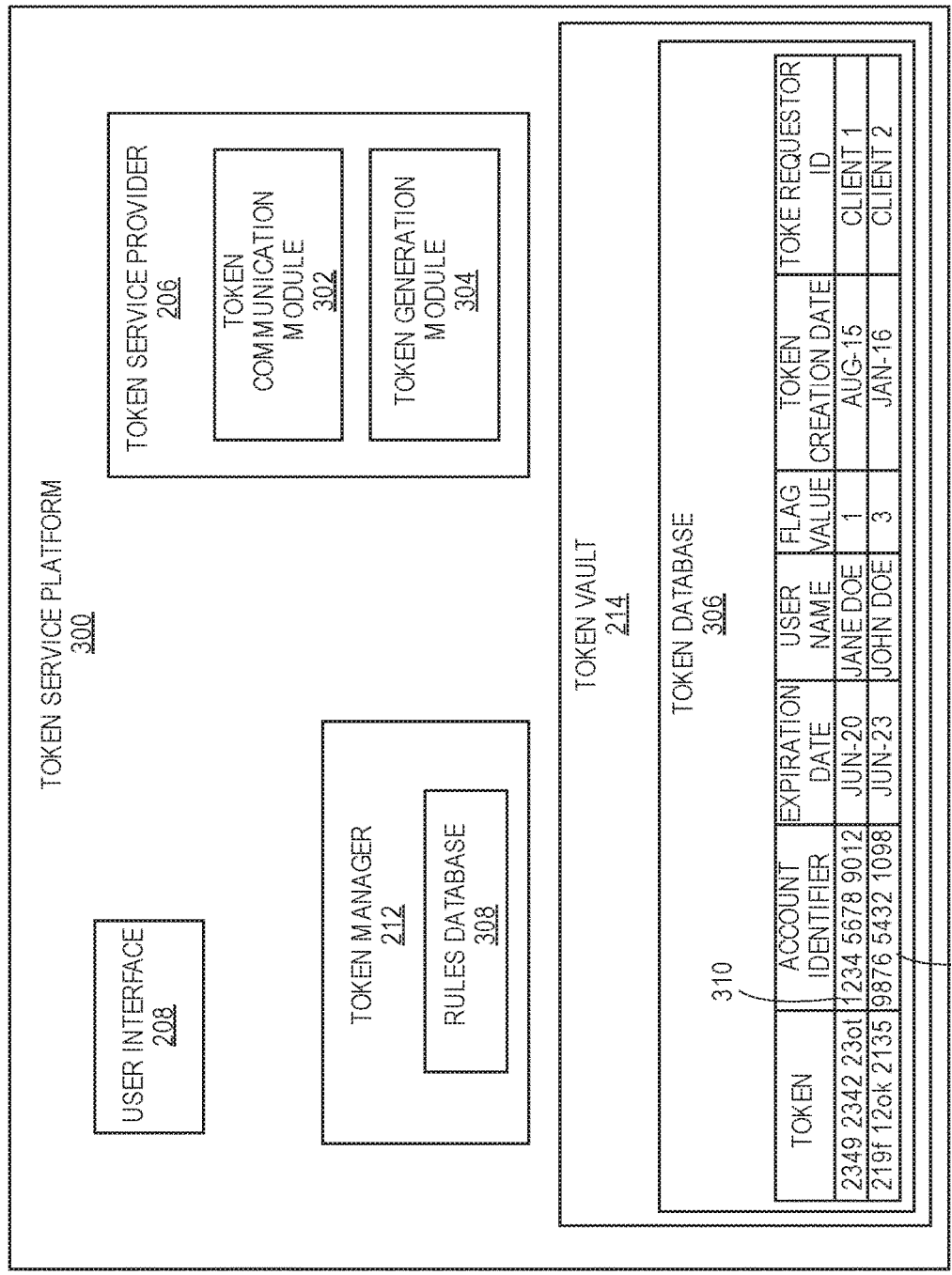
FIG. 3 is a block diagram of an exemplary tokenization generation environment illustrating various components of the environment, according to an embodiment of the invention.

According to various embodiments, the token service provider computer 206, the token vault 214, the user interface 208 and the token manager 212 may be provided by (and/or managed by) a same entity or may be part of a same environment, such as a token service platform 300 illustrated in FIG. 3. In other embodiments, the token vault 214 may be a storage external to and accessibly by the token service platform 300 or individual elements of the token service platform 300 (e.g. the token service provider computer 206 and the token manager 212).

The token service provider computer 206 may include a token communication module 302 and a token generation module 304. The token communication module 302 may receive the token request message from a token requestor (e.g. the resource provider computer 204). The token request message may include at least an account identifier (e.g. a primary account number (PAN)) of the account holder computer 202. According to various embodiments, the token request message may include additional information such as a level flag and a level value for the level flag that will be associated with the token when the token is generated.

Upon receipt of the token request message, the token communication module 302 may pass the token request message to the token generation module 304. Prior to passing the token request message, the token communication module 302 may confirm that the account identifier included in the token request message is eligible for tokenization. For example, the token communication module 302 may send the account identifier to an authorizing computer system 210 that may have issued the account identifier. In some embodiments, the token communication module 302 may interact with a third party entity to authenticate the account identifier. However, embodiments are not limited to the token communication module 302 performing the authentication of the account identifier and any other component of the token service provider computer 206 or the token service platform 300 may oversee the authentication of the account identifier included in the token request message.

The token generation module 304 may generate a token corresponding to the account identifier in response to receiving the token request message. If a level flag value and a level value for the level flag were included in the token request message, the token generation module may associate the level flag and the level value with the generated token. The token generation module 304 may then store the generated token along with the level flag and the corresponding level value at a token database 306 of the token vault 214.

FIG. 3 illustrates exemplary entries on the token database 306. One of ordinary skill in the art will appreciate that the entries 310 and 312 are provided for illustration purposes and the entries may include more or less data items and can be structured in a different format. As illustrated in FIG. 3, an exemplary database entry 310 (or database entry 312) may include the token, the account identifier corresponding to the token, an expiration date of the token (or an expiration date of the account identifier, or both), a user name (e.g. the name of the account holder), the flag value that is assigned to the token and an identifier for the token requestor. As illustrated in FIG. 3, the database entry 310 corresponds to a token requested by (e.g. generated for) a first entity (e.g. client 2) and the database entry 312 corresponds to ta token requested by (e.g. generated for) a second entity (e.g. client 1). In some embodiments, separate files (e.g. folders, spreadsheets, etc.) may be formed for each token requestor and tokens generated for that token requestor may be stored together, separate from tokens generated from any other token requestor.

In some embodiments where the token request message does not include a level flag, a token may be generated and stored in the token database 306 of the token vault 214. At a later time, the token manager 212 may assign a level flag and a level value to the existing token(s) in the token database 306. According to some embodiments, the token manager 212 may assign the level flag and the level value based on, for example, the usage frequency of the token. For example, if the token manager 212 determines that a token is being used frequently, the token manager 212 may assign a level flag with a level value indicating to store the token in the token database 306 indefinitely. In contrast, if the token manager 212 determines that a token has only been used once in a given period of time (e.g. 1 year), the token manager 212 may assign a level flag with a level value indicating to delete the token in 30 days unless the token is used for a second time.

According to some embodiments, when the token request message does not include a level flag, a level flag with a level value may be automatically assigned to the generated token. For example, if the token request message includes an indication as to whether the account identifier is an identifier previously stored by the resource provider computer 204 (e.g. card-on-file), or the account identifier is for a recurrent user, than the generated token may be associated with a level flag having a level value that will require the token to be stored indefinitely. On the other hand, if the token request message includes an indication as to the requested token will only be for a single use (or a random number indicating the times that the token is expected to be used), than the generated token may be associated with a level flag having a level value that will require the token to be stored until the token has been used once (or for the amount of times indicated in the request). Yet in other embodiments, the generated token may be associated with a level flag having a default level value that will require the token to be stored indefinitely. The resource provider computer 204 (or the token manager 212) may then access the token database 306 to change the level value that was automatically assigned to the generated token.

According to various embodiments, the resource provider computer 204 may send an instruction to the token manager 212 to assign a given level flag and a level value to an existing token. In some embodiments, the resource provider computer 204 may interact with the token manager 212 or directly with the token vault 214 via the user interface 208. The user interface 208 may give access to the rules database 308 for the resource provider computer 204 to add, remove or modify the rules at the rules database 308. The user interface 208 may also give access the token vault 214 for the resource provider computer 204 directly delete the tokens that are no longer needed. Embodiments may restrict the tokens can be modified and/or deleted by the resource provider computer 204. For example, the user interface 208 may only display the tokens on the token vault 214 that were generated for (or otherwise associated with) the resource provider computer 204. Similarly, the user interface 208 may also restrict the rules that can be modified and/or deleted by the resource provider computer 204. For example, the user interface 208 may only display the rules of the rules database 308 that were generated by (or otherwise associated with) the resource provider computer 204.

The token manager 212 may allow the resource provider computer 204 to manage the tokens that are generated on behalf of that resource provider computer 204 and stored at the token vault 214. Once the resource provider computer 204 assigns level flags and level values to the tokens, the token manager 212 may monitor the token vault 214 (and more specifically the token database 306) to identify tokens that are no longer needed and may proceed to delete the identified tokens. The token manager 212 may also generate a list of the identified (and/or deleted) tokens and provide the list to the resource provider computer 204. This way, the resource provider computer 204 may update the local token database 205 (illustrated in FIG. 2) based on the list generated by the token manager 212. The monitoring of the token vault 214 by the token manager 212 is discussed below in greater detail.

In some embodiments, the token service platform 300 may include a data storage system comprising at least the token vault 214 and the token manager 212. The token manager 212 receives, over a network communications channel, a first token and a second token for storage. The token manager 212 also receives, over the network communications channel, a first level flag in association with the first token and a second level flag in association with the second token. The level flag has one of a plurality of level values, where a level value indicates a respective set of one or more rules for managing an associated token. According to various embodiments, the first level flag and the second level flag have different level values. The token vault 214 stores the first level flag associated with the first token and the second level flag associated with the second token. The token manager 212 identifies that the first token (stored at the token vault 214) has expired based on a first set of one or more rules corresponding to a first level value of the first level flag. The token manager 212 automatically deletes the first token upon identifying that the first token has expired. The second token may be kept at the token vault 214 if the token manager 212 identifies that the second token has not expired based on a second set of one or more rules corresponding to a second level value of the second level flag.

The token manager 212 of the data storage system may receive, over the network communications channel, instructions to modify a rule among the second set of one or more rules such that modifying the rule changes an expiration time of the second token. The token manager 212 may then identify that the second token has expired based on the modified rule among the second set of one or more rules and automatically delete the second token upon identifying that the second token has expired.

B. The Rules Database

According to various embodiments, the resource provider computer 204 may define a set of rules associated with each level value of the level flag. The set of rules may be stored at a rules database 308. According to various embodiments, the rules database 308 may be a part of or managed by the token manager 212. The set of rules may define the actions to be taken on the corresponding tokens. For example, the set of rules associated with the level value 1 may indicate that the token associated with the level flag having the level value 1 is to be deleted after the first use. The set of rules associated with the level value 2 may indicate that the token associated with the level flag having the level value 2 is to be deleted after a predetermined amount of time. The set of rules associated with the level value 3 may indicate that the token associated with the level flag having the level value 3 is to be stored indefinitely.

In some embodiments, the resource provider computer 204 may interact with the token manager 212 via the user interface 208 to add, remove or modify rules in the rules database 308. For example, the resource provider computer 204 may change the level value 1 to be associated with the set of rules that require the corresponding token to be stored indefinitely. Accordingly, embodiments enable the resource provider computer 204 to manage the tokens that are generated on its behalf.

According to various embodiments, the user interface 208 may provide a predetermined set of rules to the resource provider computer 204 to pick from. For example, for a given level value, the user interface 208 may provide all possible rules that the resource provider computer 204 may associate with the given level value. In other embodiments, the user interface 208 may allow the resource provider computer 204 to provide a free-form entry for a rule. That is, the resource provider computer 204 may define the rule without any restrictions (e.g. formatting restrictions) imposed by the user interface 208.

Embodiments may allow the token manager 212 to assign a level flag to a generated token and to assign a default level value to the level flag in the absence of an instruction from the resource provider computer 204. For example, the token manager 212 may assign a level value that would store the generated token indefinitely unless the resource provider computer 204 assigns a level value to the token using the token manager 212.

II. Monitoring the Token Vault

As provided above, the token manager 212 may continuously monitor the token vault 214 (and more specifically the token database 306) to identify the tokens that need to be deleted (e.g. removed from the token vault 214). The token manager 212 may review the level value of the level flags associated with the tokens stored in the token vault 214. Based on the set of rules associated with the level values, the token manager 212 may identify the tokens that need to be deleted because they have been used for a predetermined amount of time or they have been stored for a predetermined amount of time.

For example, if the resource provider computer 204 defines level flag 2 as an indication to store tokens for 30 days, the token manager 212 may monitor the token database 306 to identify tokens associated with the level flag 2. The token database 306 entry for a token may also include the creation date of the token. Upon identifying the tokens associated with the level flag 2, the token manager 212 may calculate the time that passed since each token is generated. For example, as illustrated in FIG. 3, the database entries 310 and 312 of the token database 306 may include the token generation time associated with each entry. The token manager 212 may calculate the time between the current time and the token creation time. The token manager 212 may compare the calculated time to the predetermined amount time associated with level flag 2 (e.g. 30 days in this example). The token manager 212 may identify those tokens that are associated with the level flag 2 and created more than the predetermined amount of time (e.g. 30 days in this example). The token manager 212 may automatically delete the identified tokens. In some embodiments, the token manager 212 may send an instruction to the token vault 214 to delete the identified tokens from the token database 306. The token manager 212 may interact with the token service provider computer 206 and token vault 214 via the token service provider API 213. According to various embodiments, each rule or level flag may be translated into an API call. For example, the level value 2 for the level flag may be assigned to a token. The level value 2 may require the token to be deleted after 30 days. The token manager 212 may store an instruction to delete the token after 30 days. Upon completion of 30 days, the token manager may send a "delete call" to the token vault 214 via the token service provider API 213 to perform the delete action on the token vault 214. In some embodiments, the token vault 214 may send a list of the identified tokens to the resource provider 204 so that the resource provider computer 204 may update the local token database 205 (illustrated in FIG. 2) by deleting the tokens identified on the list.

According to various embodiments, the deleted tokens may be recycled and reused. For example, when a token is deleted, the same token may be returned to the resource provider in response to a new token request message from the resource provider. That is, the deleted token may be recycled. A recycled token may be assigned to a different account identifier (i.e. an account identifier that is different from an account number that the deleted token was previously associated with), provided to the token requestor and stored at the token vault.

In some embodiments, the token manager 212 may periodically review the tokens stored in the token vault 214 to determine those tokens that are not associated with a level flag. The token manager 212 may assign a level flag to the identified tokens (e.g. a level flag with a level value that would require the tokens to be stored indefinitely to ensure that no tokens get deleted inadvertently) or may request the resource provider computer 204 to assign level flags to the identified tokens. In some embodiments, the token manager 212 may generate a list of tokens without level flags and send the list to the resource provider 204 and request the resource provider 204 to assign level flags where missing. Yet in other embodiments, the token manager 212 may review the token vault 214 for missing level flags once when the token manager is installed, and require all subsequent tokens to be assigned a level flag prior to being stored at the token vault 214.

The token manager 212 may also monitor the token database 306 for duplicate tokens. The token manager 212 may select a given token, and search the token database 306 for a duplicate token based on a match criteria. For example, the match criteria may require the tokens to be identical (e.g. all characters of both tokens are the same and appear in the same order). If the token manager 212 identifies two entries for the same token, the token manager 212 may automatically delete one of the entries. Alternatively, the token manager 212 may inform the resource provider computer 204 and request the resource provider computer 204 to delete one of the entries. Moreover, the token manager 212 may also compare the level values of the level flags associated with the identified multiple entries for a given token. If the level values are different for each entry, the token manager 212 may not automatically delete the duplicate entry. Instead, the token manager 212 may notify the resource provider computer 204 and request the resource provider computer 204 to remedy the situation.

The duplicate entry check may also perform after the token manager 212 identifies the tokens to be deleted. For example, as explained above, the token manager 212 may identify all tokens having the level value 2 assigned to the level flag and generate a first list including the identified tokens. The token manager 212 may also identify all tokens having the level value 1 assigned to the level flag and generate a second list including the identified tokens. The level values 1 and 2 may indicate a different storage time for the tokens. The token manager 212 may cross-reference the first list and the second list. Ideally there should be no overlap between the first list and the second list, i.e. each token should be assigned only one level value. If an overlap is identified between the first list and the second list, the token manager 212 may notify the resource provider computer 204 and request the resource provider computer 204 to remedy the situation. The resource provider computer 204 may indicate the correct level value for the identified token and request the token manager 212 to delete the remaining duplicate entries.

III. Self-Cleaning Token Vault

As provided above, the token manager 212 may work with the token vault 214 to improve the storage efficiency of the token vault 214. The token manager 212 may enable the token vault 214 to self-clean itself, i.e. to remove redundant data from the token database 306 of the token vault 214. In providing such functionality, the token manager 212 may be separate from the token vault 214 and work with the token vault 214 (e.g. as discussed above in connection with FIG. 3), or the token manager 212 may be embodied in the token vault 214.

In some embodiments, the token vault 214 may include the logic to monitor itself and identify the tokens that need to be deleted (e.g. removed from the token vault 214). The token vault 214 may then proceed to remove the identified tokens. In some embodiments, the token vault 214 may notify the resource provider computer 204 when tokens are deleted. In some embodiments, the token vault 214 may inform the resource provider computer 204 prior to deleting the token in order to give a chance to the resource provider computer 204 to override the decision or to take action to prevent the token from being deleted. In such embodiments, the token vault 214 may embody all functionalities and properties of the token manager 212 as discussed above, i.e. the token manager 212 may be embedded in the token vault 214.

The token vault 214 may include a data storage system that receives generated tokens for storage. The token vault 214 may communicate with the token generation module 304 of the token service provider 206 over a network communications channel to receive the generated tokens. The data storage system also receives a level flag having a level value in association with a generated token. The level value indicates a set of rules for managing the token. The data storage system stores the level flag associated with the received token. The data storage system continuously monitors the stored tokens to identify that a given token has expired based on the set of rules corresponding to the level value of the level flag associated with that token. The data storage system then automatically deletes the expired token. The data storage system continues to store the tokens identified as valid (e.g. not expired) based on the set of rules associated with the level value of level flags of remaining tokens. At any given time, the entity that created the rules may modify the rules. The data storage system may receive instructions to modify a rule among the set of rules such that modifying the rule changes an expiration time of a certain token. Since the data storage system continuously monitors the stored tokens, the data storage system may identifying that that certain token has expired based on the modified rule and automatically delete the expired token.

The token manager 212 (as part of the token vault 214 or as a separate module) may manage the tokens stored at the token database 306 of the token vault 214. For example, the token manager 212 may continuously monitor the token vault 214 (e.g. the token database 306) to identify expired or otherwise redundant tokens. The token manager 212 then proceeds to remove the tokens. Exemplary methods performed by the token manager 212 may include the initialization of the token manager, starting with registering a token requestor. The token manager 212 may then oversee the generation, storage and removal of the tokens generated for the registered token requestor. The token manager 212 may also oversee the rules stored at the rules database 308. These rules may be set up by token requesting entities and may be modified (e.g. rules added, removed or edited) by the associated token requesting entity. These methods are described next.

A. Initialization of Token Manager

Figure 4:
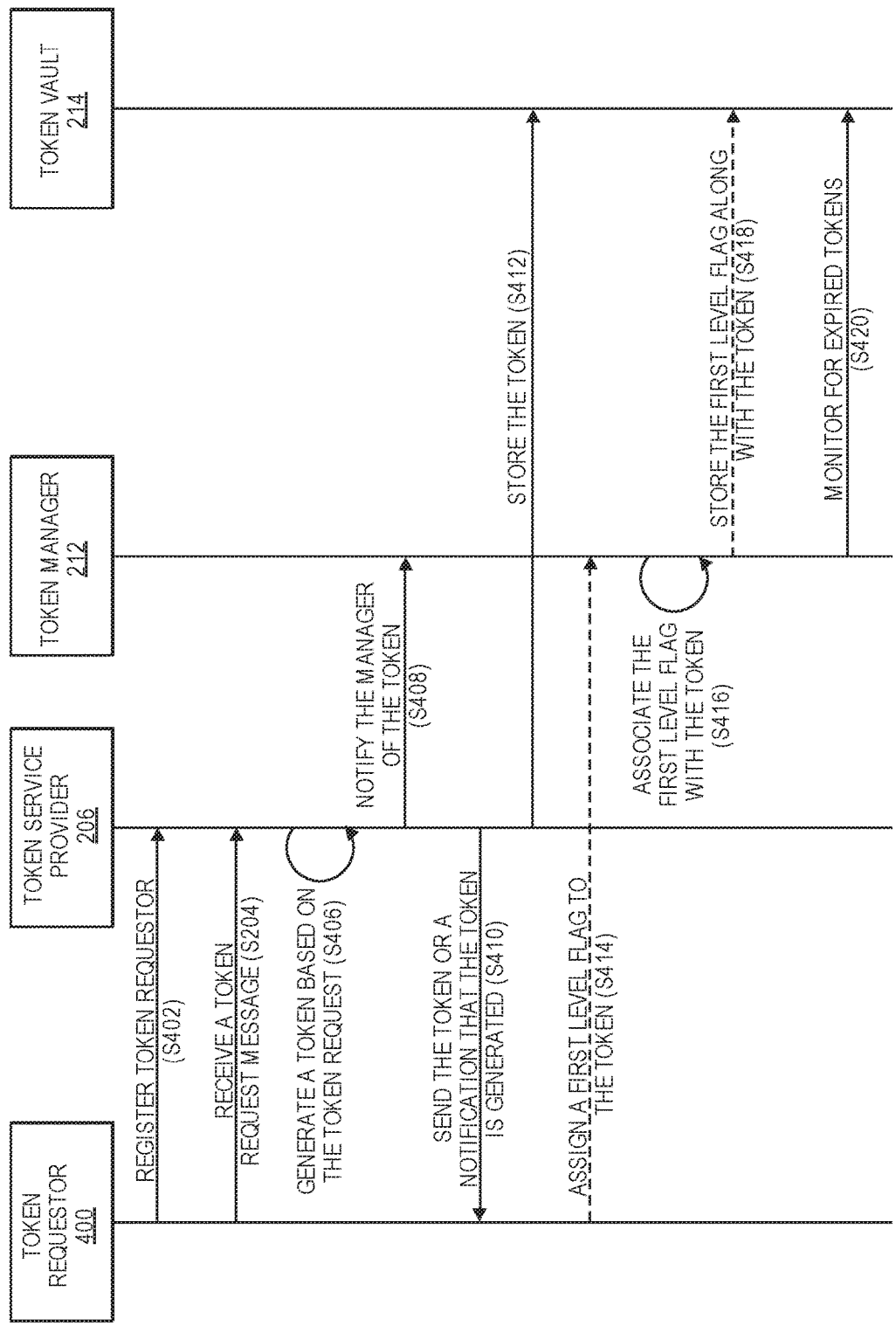
FIG. 4 is a flowchart illustrating steps for generating and storing a token along with a level flag, according to an embodiment of the invention.

Embodiments provide a method for assigning a level flag to tokens during or after generation of the token. FIG. 4 illustrates a flowchart illustrating steps for generating and storing a token along with a level flag.

At S402, the token requestor 400 (e.g. the resource provider computer 204) registers with the token service provider computer 206. The token requestor 400 may be assigned an identifier by the token service provider computer 206. In some embodiments, all tokens generated for the token requestor 400 may be stored along with the identifier or at a portion of the token vault 214 specifically assigned to the token requestor 400.

At S404, upon registering the token requestor 400, the token service provider computer 206 receives a token request message from the token requestor 400 over a first network communications channel. The token request message may include an account identifier identifying an account of a user (e.g. account holder). In some embodiments, the token request message may include additional identifying information such as the token requestor identifier assigned to the token requestor upon registering with the token service provider computer 206. The token request message may also include user identifying information such as user name, mailing address, and the like. In some embodiments, the token request message may include a level flag and a level value for the level flag for association with the token when the token is generated by the token service provider computer 206 for the account identifier.

At S406, the token service provider computer 206 generates a token corresponding to (e.g. representing) the account identifier provided in the token request message. Prior to generating the token, the token service provider computer 206 may contact an entity (e.g. a third party security entity or an issuer of the account identifier) to confirm that the account identified by the account identifier is in good standing (e.g. there are no fraud flags or warnings associated with the account or the account is otherwise authorized for tokenization).

When the token is generated, at S408, the token service provider computer 206 notifies the token manager 212 about the newly generated token. In some embodiments, the token manager 212 may be monitoring the token service provider computer 206 and may automatically detect the generation of a new token.

At S410, the token service provider computer 206 sends the generated token to the token requestor 400. In some embodiments, the token service provider computer 206 may simply notify the token requestor 400 that the token has been generated without providing the token itself. At S412, the token service provider computer 206 stores the generated token and a mapping between the token and the corresponding account identifier at the token vault 214. According to various embodiments, the token vault 214 may also store an indication of when each token has been generated and how many times (or the exact times when) each token has been used in a transaction.

As provided above, the token requestor 400 may include a first level flag for association with the token in the token request message. In some embodiments, the token requestor 400 provides the first level flag and a first level value for the first level flag in a separate message sent to the token manager 212 (at S414). The subsequent message (sent at S414) may also include the first token to ensure that the first level value is associated with the correct token.

At S416, the token manager associates the first level flag and the first level value with the generated token. As provided above, the first level flag may be generated by the token manager, provided by the token requestor 400 to the token manager 212 or provided by the token requestor to the token service provider computer 206 in the token request message. Once assigned or associated with the token, the token level flag and the level flag value are stored in the token vault 214 along with the generated token (at S418). In some embodiments, the token level flag and/or the token level flag value may be stored at a storage (e.g. database) other than the token vault 214.

According to various embodiments, the token generation steps (S404-S418) may be repeated with the same or different token requestor(s) and multiple tokens may be generated and stored at the token vault 214.

The token manager 212 continuously monitors the token vault 214 to identify expired tokens (S420). The token manager 212 may then delete or remove the identified expired tokens from the token vault 214 thereby improving the storage efficiency of the token vault and eliminating the cost and processing power associated with storing the expired tokens.

For example, a level value of the level flag may be associated with a set of rules. For example, the level value may be a numeric value such as a number between 1 and 3. The level value of 1 may be associated with a rule that requires the token associated with the level flag having the level value of 1 to be stored only until the token is used once. Upon the first use, the token associated with the level flag having the level value of 1 is to be deleted from the token vault 214. The token manager 212 may continuously monitor the token vault to identify tokens associated with the level flag having the level value of 1 and determine whether the identified tokens have already been used once. The token manager 212 may then proceed to remove or delete the identified tokens that have already been used from the token vault 214.

In some embodiments, the level value of 2 may be associated with a rule that requires the token associated with the level flag having the level value of 2 to be stored only for a predetermined amount of time (e.g. 30 days). By the end of the predetermined amount of time, the token associated with the level flag having the level value of 2 is to be deleted from the token vault 214. The token manager 212 may continuously monitor the token vault to identify tokens associated with the level flag having the level value of 2 and determine whether the identified tokens have already been stored for more than the predetermined amount of time (e.g. at least 31 days). The token manager 212 may then proceed to remove or delete the identified tokens that have been stored for more than the predetermined amount of time from the token vault 214.

In some embodiments, the level value of 3 may be associated with a rule that requires the token associated with the level flag having the level value of 3 to be stored indefinitely. The token manager 212 may continuously monitor the token vault to identify tokens associated with the level flag having the level value of 3 and take no action in connection with the identified tokens.

B. Modification of a Rule

Embodiments may enable a token requestor to manage the tokens generated for that token requestor via the token manager. For example, the token requestor may modify a rule associated with the level value of the level flag associated with a token. Alternatively, the token requestor may assign a new level value to a level flag of a token thereby modifying the lifespan of the token.

Figure 5:
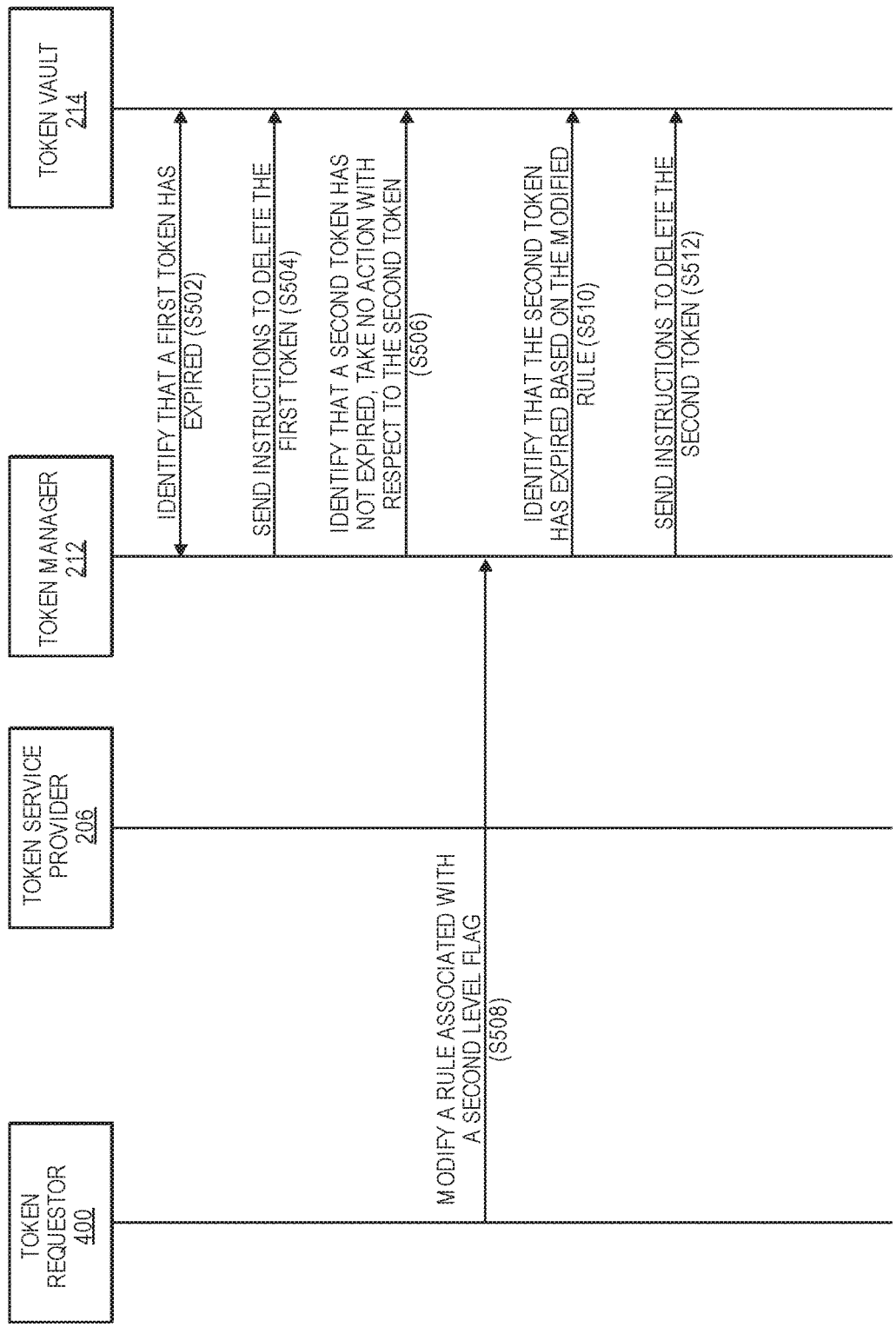
FIG. 5 is a flowchart illustrating steps for managing a generated token based on a level flag associated with the token, according to an embodiment of the invention.

FIG. 5 illustrates a flowchart illustrating steps for managing a token stored in a token vault. As provided above, the token manager 212 continuously monitors the token vault 214 to identify expired tokens. For example, the token manager 212 may calculate the difference between the current time and the token creation time for each token. Then, based on the level value of the level flag associated with each token, the token manager 212 may determine the tokens that are expired (e.g. that have been stored for longer than the rule assigned to the token allows for).

At S502, the token manager 212 identifies that a first token stored at the token vault 214 has expired. For example, the token manager 212 may determine that the level flag value of the level flag associated with the first token requires the token to be deleted upon first use. The token manager 212 may also determine that the first token has already been used once. In another exemplary implementation, the token manager 212 may determine that the level flag value of the level flag associated with the first token requires the token to be deleted after a predetermined period of time. The token manager 212 may also determine that the first token has been stored for more than the predetermined period of time.

At S504, the token manager 212 sends instructions to the token vault 214, over a second network communications channel, to delete the first token.

While monitoring the token vault 214, the token manager 212 also identifies a second token that has not yet expired (at S506). For example the token manager 212 may determine that the level flag value of the level flag associated with the second token requires the second token to be stored indefinitely. Alternatively, the token manager 212 may determine that the level flag value of the level flag associated with the second token requires the second token to be stored for a predetermined amount of time which has not yet expired. The token manager 212 may take no action with respect to the second token and may continue monitoring the token vault 214.

At S508, the token requestor 400 modifies the rule associated with the level value of the flag associated with the second token. For example, the token requestor 400 may access the rules database stored by the token manager 212. The rules database may be password protected, and the token requestor 400 may provide the proper password to the token manager 212 before gaining access to the rules database. The token requestor 400 may then be provided all rules set up by the token requestor 400. The token requestor 400 may modify the entries on the rules database. For example, the token requestor 400 may change the meaning of level 1 from "store indefinitely" to "store for 200 days".

In some embodiments, the token requestor 400 may directly modify the level value of the level flag of the second token. For example, the token requestor 400 may access the token database stored by the token vault 214. The token database may be password protected, and the token requestor 400 may provide the proper password to the token manager 212 before gaining access to the token database. The token requestor 400 may then be provided all tokens generated for the token requestor 400. The token requestor 400 may modify the entries on the token database. For example, the token requestor 400 may change the level value of the level flag of the second token. Based on the modified rule or the modified level value, the second token may now be identified as being expired (at S510).

At S512, the token manager 212 sends instructions to the token vault 214 to delete the second token which is now identified as being expired. In some embodiments, the token manager 212 may be able to automatically remove the expired token from the token vault 214.

Accordingly, some embodiments provide a token manager and/or a self-cleaning token vault that identify expired or redundant tokens. The manager and/or the self-cleaning token vault may automatically delete the identified tokens thereby improving the over processing speed of a tokenization environment. Embodiments further improve the data storage usage and decrease the inefficiencies associated with storing redundant or expired information. Embodiments further enable the resource provider computer to add context to the generated tokens (e.g. to contextually value the generated tokens) to associate an importance value to the generated tokens. Moreover, embodiments allow for recycling of the expired tokens by deleting the token from the token vault (or token database) and allowing for the token to be associated with a new account identifier in response to a recent (e.g. new) token generation request. As provided above, the tokens stored at the token vault are generated on behalf of a resource provider. Embodiments enable the resource provider to manage the tokens generated on its behalf by deleting expired tokens or by assigning level values (e.g. token importance indicator) to the tokens. Hence, embodiments make the token system more transparent to the transacting entities. In addition, the token vault stores tokens associated with unique data (e.g. a custom value for interaction with the account holders) assigned by the resource provider IV. Computer System The various participants and elements described herein with reference to FIGS. 1-5 may operate one or more computer apparatuses to facilitate the functions described herein. Any of the elements in FIGS. 1-5, including any servers or databases, may use any suitable number of subsystems to facilitate the functions described herein.

Figure 6:
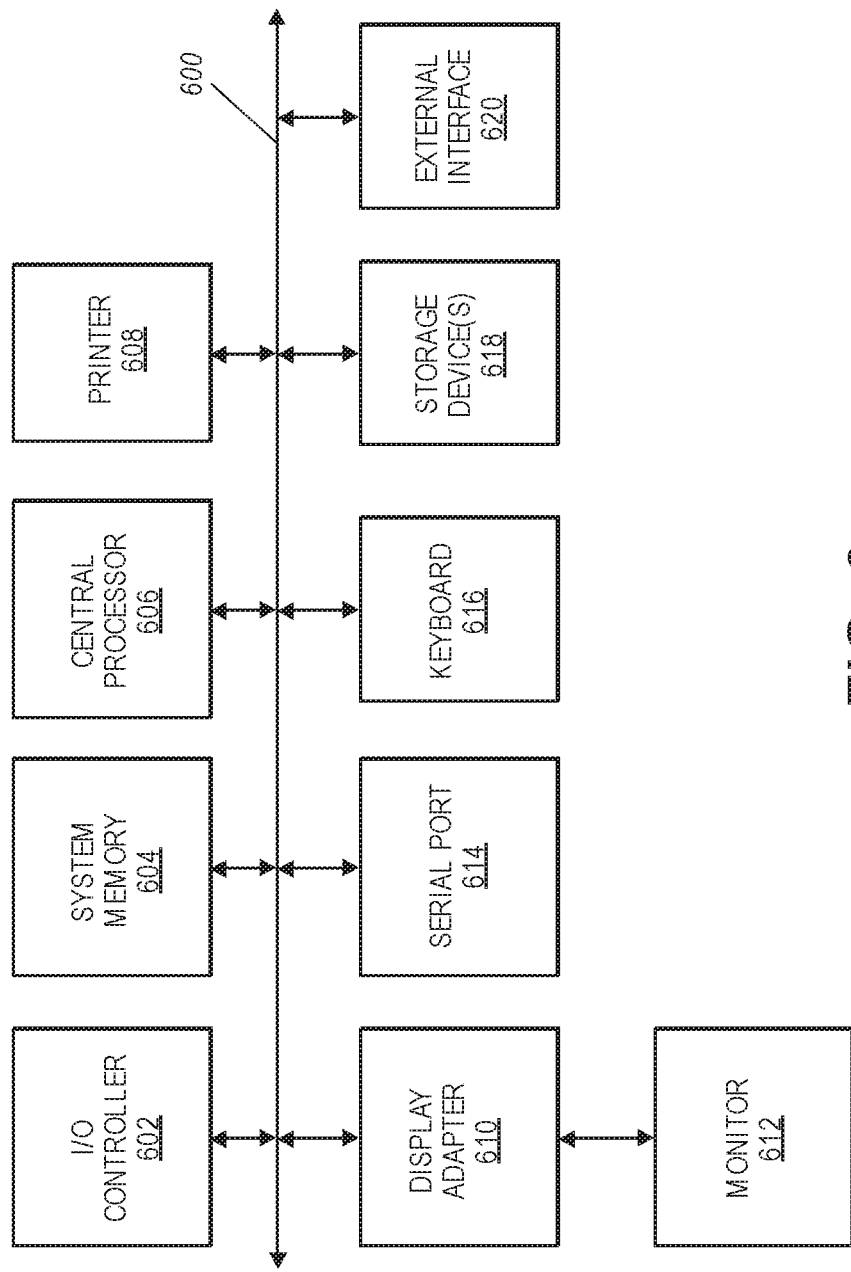
FIG. 6 is a block diagram of a computer apparatus that may be used to implement embodiments disclosed herein, according to an embodiment of the invention.

Examples of such subsystems or components are shown in FIG. 6. The subsystems shown in FIG. 6 are interconnected via a system bus 600. Additional subsystems such as a printer 608, keyboard 616, fixed disk 618 (or other memory comprising computer readable media), monitor 612, which is coupled to display adapter 610, and others are shown. Peripherals and input/output (I/O) devices, which couple to I/O controller 602 (which can be a processor or other suitable controller), can be connected to the computer system by any number of means known in the art, such as serial port 614 (e.g., USB,FireWire®). For example, serial port 614 or external interface 620 (e.g. Ethernet, Wi-Fi, etc.) can be used to connect the computer apparatus to a wide area network such as the Internet, a mouse input device, or a scanner. The interconnection via system bus allows the central processor 606 to communicate with each subsystem and to control the execution of instructions from system memory 604 or the fixed disk 618 (e.g., a hard drive or optical disk), as well as the exchange of information between subsystems. The system memory 604 and/or the fixed disk 618 may embody a computer readable medium. Any of the data mentioned herein can be output from one component to another component and can be output to the user.

A computer system can include a plurality of the same components or subsystems, e.g., connected together by external interface 620 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

In the foregoing description, for the purposes of explanation, specific details are set forth in order to provide a thorough understanding of embodiments of the invention. However, it will be apparent that various embodiments may be practiced without these specific details. For example, circuits, systems, algorithms, structures, techniques, networks, processes, and other components may be shown as components in block diagram form in order not to obscure the embodiments in unnecessary detail.

It is to be understood that embodiments of the invention may include more or fewer than the components shown individually in a diagram. The figures and description are not intended to be restrictive.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method comprising performing by a computer system:
   receiving, over a first network communications channel, a plurality of token generation request messages from one or more token requestors;
   causing a plurality of tokens to be generated and stored in a token vault managed by the computer system, wherein a first token is generated in response to a first token generation request message from a first token requestor, wherein the first token is stored in the token vault after being generated, wherein a copy of the first token is sent to and stored on a device of the first token requestor;

associating a first expiration threshold and a first level flag having a first level value with the first token, wherein a level flag has one of a plurality of level values, wherein a level value indicates a respective set of one or more modifiable rules for managing an associated token in the token vault;

storing the first level flag having the first level value and the first expiration threshold in association with the first token as a first entry at the token vault;

managing the plurality of tokens stored in the token vault using the level values of the level flags corresponding to the tokens, wherein the managing includes:

identifying that the first token has not expired based on a first set of one or more modifiable rules corresponding to the first level value of the first level flag, wherein applying the first set of one or more modifiable rules results in a store action for the first level value of the first token;

receiving, over the first network communications channel, an instruction to modify the first set of one or more modifiable rules corresponding to the first level value of the first level flag from the first token requestor;

modifying the first set of one or more modifiable rules into a modified first set of one or more modifiable rules based on the instruction, wherein applying the modified first set of one or more modifiable rules results in a delete action for the first token; and after modifying:

identifying that the first token has expired based on the modified first set of one or more modifiable rules corresponding to the first level value of the first level flag; and automatically removing the first token from the token vault in response to identifying that the first token has expired and based on the first level value of the first level flag, thereby removing all elements of the first entry associated with the first token from the token vault.

2. The method of claim 1, wherein the managing further comprises:

continuously monitoring the token vault to identify tokens that are expired.

3. The method of claim 1, wherein automatically removing the first token from the token vault further comprises:

sending, over a second network communications channel, an instruction to the token vault to delete the first token.

4. The method of claim 1, wherein the first level flag is associated with the first token based on an instruction received from token requestor of the first token.

5. The method of claim 1, wherein the first token generation request message includes the first level flag.

6. The method of claim 1, wherein the level value indicates use characteristic of a corresponding token.

7. The method of claim 1, further comprising, after removing the first token from the token vault:

reusing the first token by associating the first token with a user account identifier, wherein the first token was associated with a different user account identifier prior to being removed from the token vault.

8. The method of claim 1, wherein a token replaces a user account identifier included in a corresponding token generation request message.

9. A data storage system comprising:

means for receiving, over a network communications channel, a first token for storage at a token vault;

means for receiving, over the network communications channel, a first level flag having a first level value and a first expiration threshold in association with the first token, wherein a level flag has one of a plurality of level values, wherein a level value indicates a respective set of one or more rules for managing an associated token, wherein the first level flag and a second level flag have different level values, wherein a copy of the first token is sent to and stored on a device of a first token requestor;

means for storing the first level flag and the first expiration threshold associated with the first token as a first entry at the token vault;

means for identifying that the first token has not expired based on a first set of one or more modifiable rules corresponding to the first level value of the first level flag, wherein applying the first set of one or more modifiable rules results in a store action for the first level value of the first token;

means for receiving, over the network communications channel, an instruction to modify the first set of one or more modifiable rules corresponding to the first level value of the first level flag from the first token requestor;

means for modifying the first set of one or more modifiable rules into a modified first set of one or more modifiable rules based on the instruction, wherein applying the modified first set of one or more modifiable rules results in a delete action for the first token; and after modifying:

means for identifying that the first token has expired based on the modified first set of one or more rules corresponding to the first level value of the first level flag; and means for automatically deleting the first token in response to identifying that the first token has expired and based on the first level value of the first level flag, thereby removing all elements of the first entry associated with the first token from the token vault.

10. An apparatus, comprising:

a processor configured to execute a set of instructions;

a memory coupled to the processor for storing the set of instructions; and the set of instructions stored in the memory, wherein when the set of instructions are executed by the processor, the apparatus operates to:

receive, over a first network communications channel, a plurality of token generation request messages from one or more token requestors;

cause a plurality of tokens to be generated and stored in a token vault managed by the apparatus, wherein a first token is generated in response to a first token generation request message from a first token requestor, wherein the first token is stored in the token vault after being generated, wherein a copy of the first token is sent to and stored on a device of the first token requestor;

associate a first expiration threshold and a first level flag having a first level value with the first token, wherein a level flag has one of a plurality of level values, wherein a level value indicates a respective set of one or more modifiable rules for managing an associated token in the token vault;

store the first level flag and the first expiration threshold in association with the first token as a first entry at the token vault;

store a second level flag in association with a second token as a second entry at the token vault; and manage the plurality of tokens stored in the token vault using the level values of the level flags corresponding to the tokens, wherein the managing includes:

identifying that the first token has not expired based on a first set of one or more modifiable rules corresponding to the first level value of the first level flag, wherein applying the first set of one or more modifiable rules results in a store action for the first level value of the first token;

receive, over the first network communications channel, an instruction to modify the first set of one or more modifiable rules corresponding to the first level value of the first level flag from the first token requestor;

modify the first set of one or more modifiable rules into a modified first set of one or more modifiable rules based on the instruction, wherein applying the modified first set of one or more modifiable rules results in a delete action for the first token; and after modifying:
identifying that the first token has expired based on the first set of one or more modifiable rules corresponding to the first level value of the first level flag; and automatically removing the first token from the token vault in response to identifying that the first token has expired and based on the first level value of the first level flag, thereby removing all elements of the first entry associated with the first token from the token vault.

11. The apparatus of claim 10, wherein when managing the plurality of tokens stored in the token vault, the apparatus further operates to:
continuously monitor the token vault to identify tokens that are expired.

12. The apparatus of claim 10, wherein when automatically removing the first token from the token vault, the apparatus further operates to:
send, over a second network communications channel, an instruction to the token vault to delete the first token.

13. The method of claim 1, further comprising:
continuously monitoring the token vault to identify tokens that are expired; and
periodically removing expired tokens from the token vault.

14. The method of claim 1, wherein the store action or the delete action is independent from the first expiration threshold associated with the first token.

15. The method of claim 1, further comprising:
generating a second token in response to a second token generation request message;
associating a second expiration threshold and a second level flag having a second level value with the second token, wherein the first level flag and the second level flag have different level values; and
storing the second level flag having the second level value and the second expiration threshold in association with the second token as a second entry at the token vault,
wherein the managing the plurality of tokens further includes:
identifying that the second token has not expired based on a second set of one or more modifiable rules corresponding to the second level value of the second level flag.

* * * * *